United States Patent [19]

Langsdorf et al.

[11] Patent Number: 5,665,231
[45] Date of Patent: Sep. 9, 1997

[54] FULL FLOW/BYPASS FILTER ASSEMBLY

[75] Inventors: Brian James Langsdorf, Toledo; Ralph Allen Knopp, Grand Rapids; Gerard Walter Bilski, Perrysburg, all of Ohio

[73] Assignee: AlliedSignal Inc., Morristown, N.J.

[21] Appl. No.: 551,683

[22] Filed: Nov. 1, 1995

[51] Int. Cl.[6] .................................................. B01D 27/14
[52] U.S. Cl. ........................ 210/314; 210/352; 210/357; 210/359; 210/488; 210/492; 210/DIG. 13
[58] Field of Search ........................................ 210/350, 357, 210/359, 455, 463, 483, 488, 492, DIG. 13, 314, 352

[56] References Cited

U.S. PATENT DOCUMENTS

| | | | |
|---|---|---|---|
| 1,867,137 | 7/1932 | Carver | 210/350 |
| 2,495,095 | 1/1950 | Ewbank | 210/169 |
| 2,856,076 | 10/1958 | Whipple | 210/492 |
| 3,481,472 | 12/1969 | Petri | 210/492 |
| 3,674,084 | 7/1972 | Martin | 210/492 |
| 5,447,627 | 9/1995 | Loafsman et al. | 210/DIG. 13 |

FOREIGN PATENT DOCUMENTS

| | | | |
|---|---|---|---|
| 718712 | 9/1965 | Canada | 210/DIG. 13 |

Primary Examiner—W. L. Walker
Attorney, Agent, or Firm—Howard G. Massung

[57] ABSTRACT

A filter of the type having first annular filter media comprising a generally columnar stack of annular filter media lamina for providing filtration for one circuit, a harness for retaining the filter media lamina in stacked columnar alignment comprising a generally circular end piece having a diameter somewhat greater than the diameter of the filter media lamina engaging one end lamina, an annular portion engaging the opposite end lamina, a plurality of elongated strips integral with and extending from the periphery of the annular portion with the end piece receiving and retaining the free ends of the elongated strips. There is a second filter media providing filtration for another circuit. The two filter media are housed adjacent to one another in a hollow cylindrical shell closed at one end. An annular retainer is integral with the shell near the other shell end for engaging the second media and retaining both media axially within the shell. The annular retainer has a plurality of apertures for providing a inlet to the common path. A grommet defines an intermediate generally annular path from within the annulus of the second media to the end of the cylindrical shell opposite the closed one end. The grommet cooperates with a base member when installed thereon to isolate the inlet, common path, annular path and central path each from the other.

17 Claims, 4 Drawing Sheets

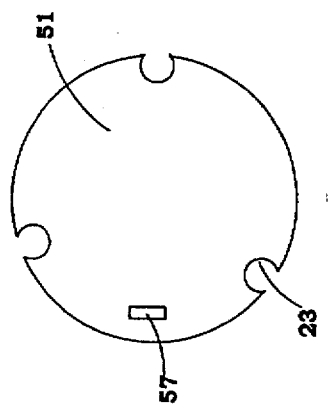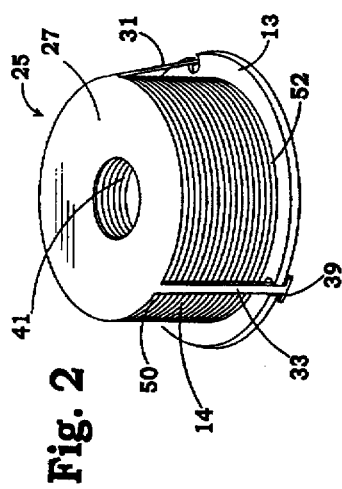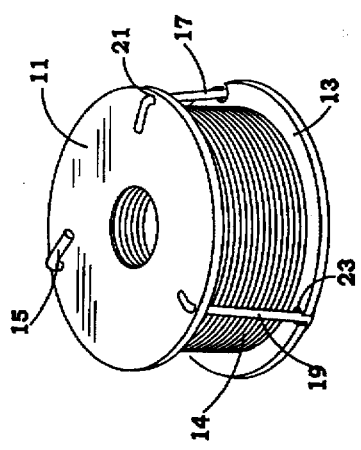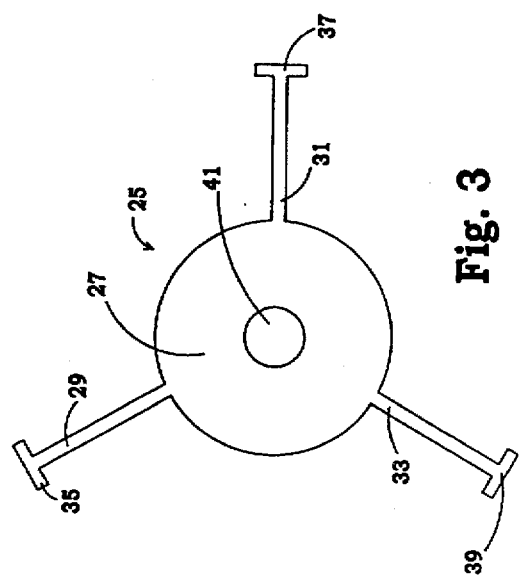

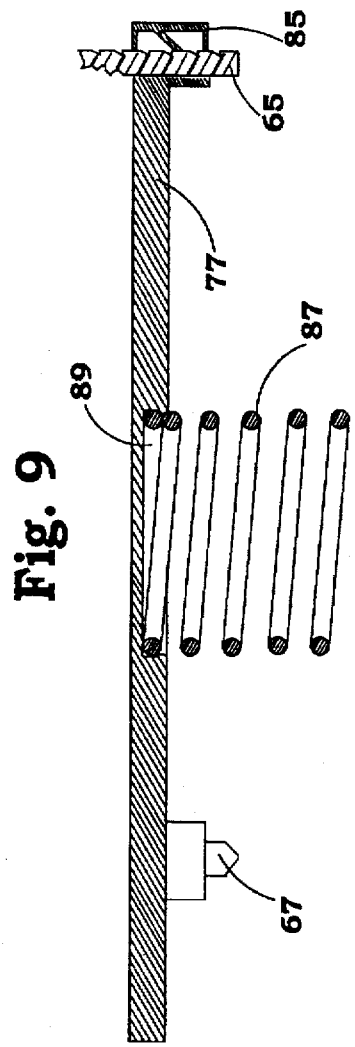
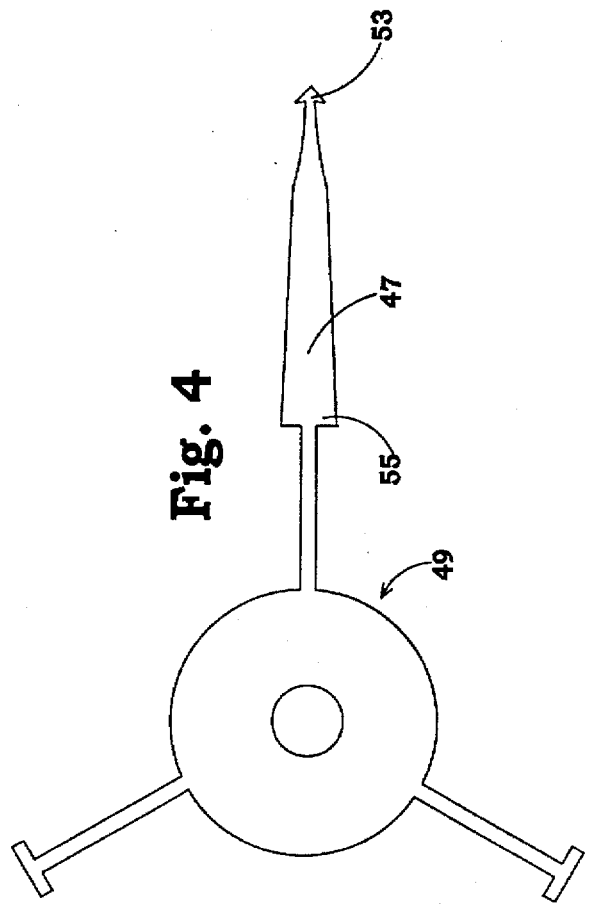
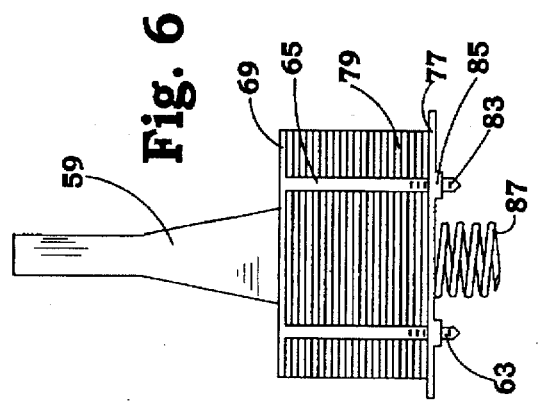
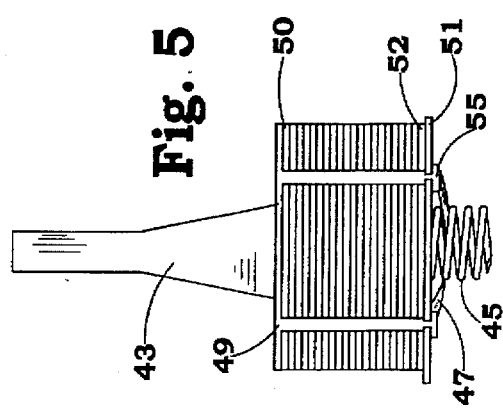

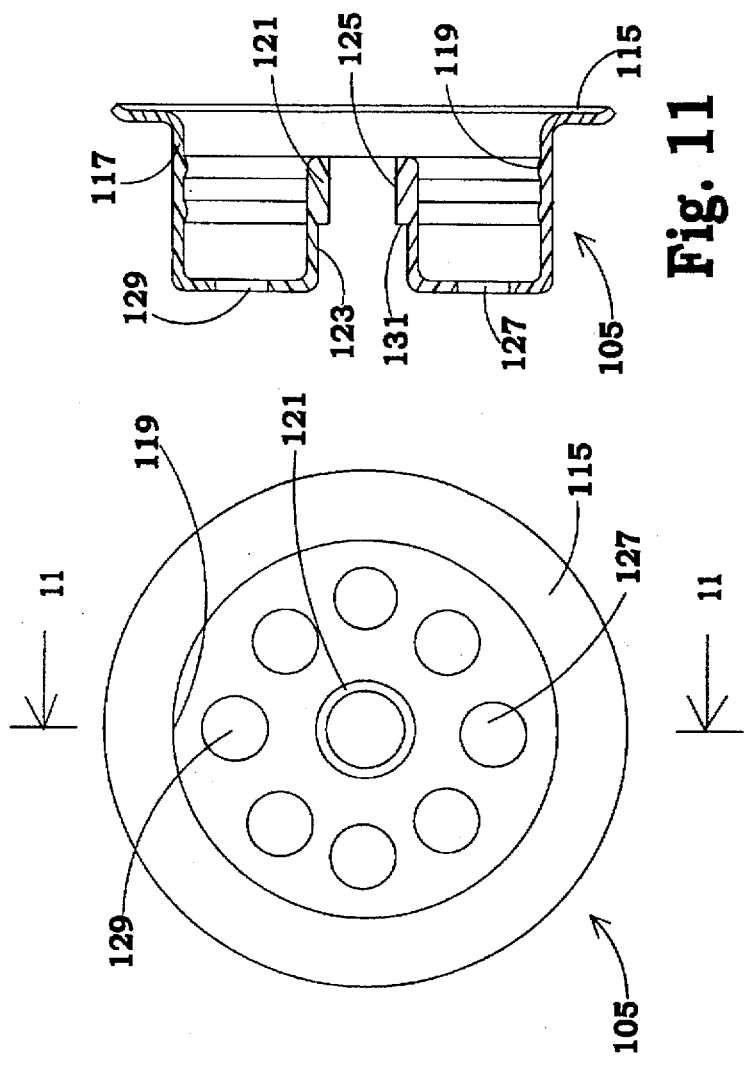
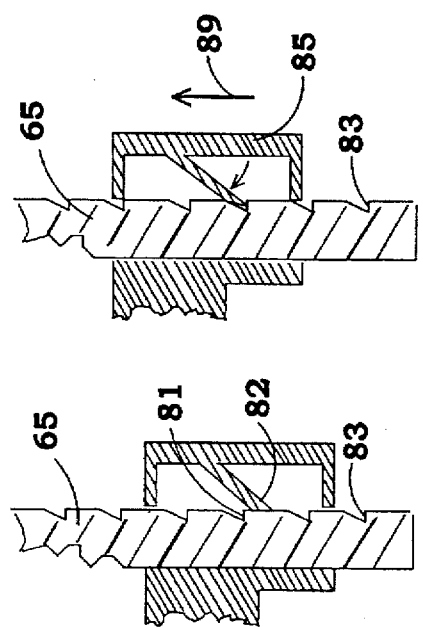
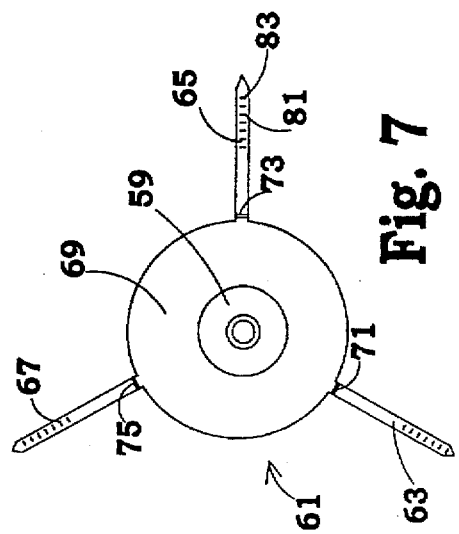

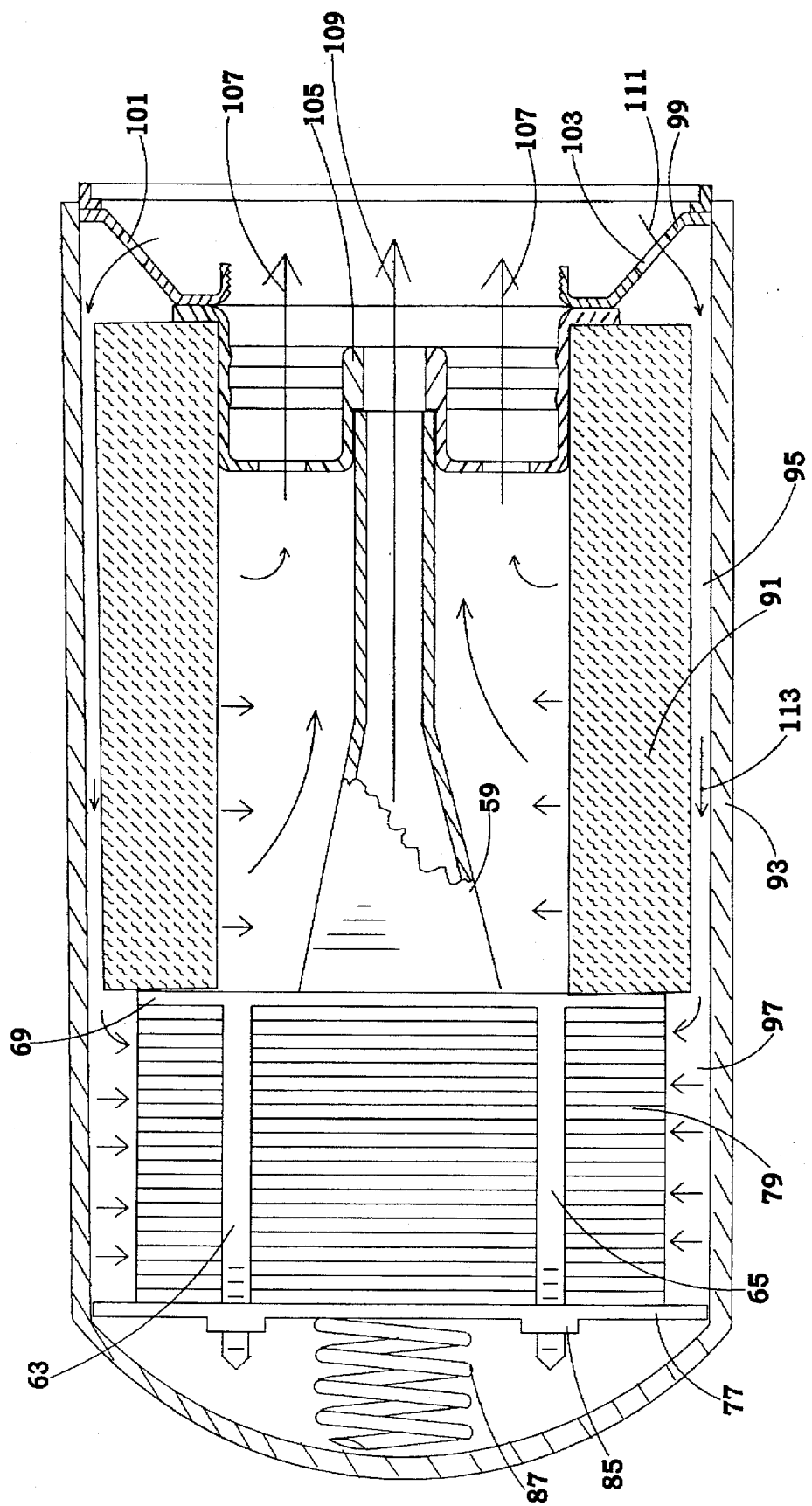

FULL FLOW/BYPASS FILTER ASSEMBLY

The present invention relates generally to methods and apparatus for removing undesirable particles from lubricants and more particularly to an improved filter cartridge or head member of a type having at least two dissimilar filtering media therein and including a multifunction grommet and improved filter media retaining device.

It is desirable to provide separate lubricant circuits in certain internal combustion engines and to do so with but a single filter cartridge. So-called full flow/bypass filters are well known in the literature and are commercially available. Known dual media filters of this type employ a metal end plate and two gaskets to define the full flow circuit exit from the filter cartridge or head and to isolate the full flow circuit from the bypass circuit filter exit and from the common lubricant inlet. It would be highly desirable to reduce this number of parts and thereby simplify the assembly of such a filter cartridge. The known dual media filters of this type frequently employ a stack of felt or paper disks or other laminae as the bypass circuit media. These lamina may be circular, hexagonal, octagonal, or of other geometries. The term "lamina" as used herein is intended to cover any of these disk-like shapes. Likewise, "diameter" describes the greatest diagonal in case the lamina is polygonal. The lamina typically include one or more holes and may be either aligned or staggered, but in either case, they assume a columnar form with interior filtered lubricant pathways. These stacks are held in compression by several rods which extend between opposed end plates which are also called pressure plates. There are two plates and three or more rods. It would also be highly desirable to reduce this number of parts and thereby simplify the assembly of such a filter cartridge. A compression spring typically lies between the closed end of the filter cartridge case or shell and one end plate of the stack. During cartridge assembly, this spring is difficult to properly position. One solution in the past has been to employ a more costly than necessary spring of maximum diameter nearly as great as that of the shell. It would be highly desirable to reduce the cost of this spring while retaining the ease of positioning the spring during assembly.

The present invention provides solutions to the above problems by providing a harness for retaining filter media disks in stacked cylindrical or columnar alignment having a lubricant impervious end piece with a diameter somewhat greater than the diameter of the filter media disks. The end piece engages one end filter media disk. An annular portion engages the opposite end filter media disk. The annular portion has a plurality of elongated strips integral therewith and extending from the periphery thereof. The end piece includes peripherally disposed portions for receiving and retaining the free ends of the elongated strips.

In accordance with another aspect of the invention, a grommet within a filter cartridge shell defines an intermediate lubricant path from within an annulus of one filter media to the end of the cylindrical shell which mates with a base member. The grommet cooperates with the base member when installed thereon to isolate a lubricant inlet, a common lubricant path, the intermediate lubricant path and a central lubricant path each from the other. The grommet includes an outer radial portion interposed between a retainer portion of the shell and one end of the one filter media, an outer cylindrical portion having an inner surface for sealingly engaging a full flow circuit fitting on the base member, an inner cylindrical portion having a first inner cylindrical surface sealingly engaging a standpipe which forms a portion of the central lubricant path, and a second inner cylindrical surface for sealingly engaging a bypass circuit fitting on the base member.

BRIEF DESCRIPTION OF THE DRAWING

FIG. 1 is an isometric view of a stack of filter media disks illustrating a prior art technique for compressing the stack;

FIG. 2 is an isometric view illustrating compression of the media stack of FIG. 1 according to one form of the present invention;

FIG. 3 is a plan view of the top end piece and integral strips of FIG. 2;

FIG. 4 is a plan view showing one modification to the end piece of FIG. 3;

FIG. 4a is a plan view of a bottom pressure plate modified for use in conjunction with the end piece of FIG. 4;

FIG. 5 is a side elevation view of a filter media stack employing the end piece of FIG. 4 along with a compression spring and stand pipe ready to be assembled into a cartridge shell;

FIG. 6 is a side elevation view similar to FIG. 5, but illustrating modified top and bottom end plates;

FIG. 7 is a plan view of the top end plate of FIG. 6;

FIGS. 8a and 8b are cross-sectional views of a peripheral portion of the bottom end plate of FIG. 6 showing how it joins to the depending strips of the top end plate;

FIG. 9 is a diametral cross-sectional view of the bottom end plate of FIG. 6;

FIG. 10 is an end view of a full flow, bypass and common inlet defining grommet according to the present invention;

FIG. 11 is a view in cross-section along lines 11—11 of FIG. 10; and

FIG. 12 is a partially cross-sectioned side view of a filter cartridge incorporating the grommet of FIGS. 10 and 11 and the media stack assembly of FIG. 6.

Corresponding reference characters indicate corresponding parts throughout the several views of the drawing.

DESCRIPTION OF THE PREFERRED EMBODIMENT

In FIG. 1 upper 11 and lower 13 pressure plates engage the outermost lamina in a stack 14 of filter media elements. The pressure plates are held in place by three index rods 15, 17 and 19 having enlarged or irregular ends. The rods pass through holes such as 21 in the upper pressure plate and engage notches such as 23 in the lower pressure plate thereby holding the stack in a columnar form during filter assembly. This structure employs an excessive number of parts and requires an excessive assembly time.

In FIG. 2, the upper pressure plate 11 and the three index rods 15, 17 and 19 have been eliminated and those four parts replaced by a single elastic harness 25. The harness 25 includes a flat pliable gasket or end piece 27 which is generally circular and lubricant impervious. End piece 27 has a diameter somewhat greater than the lateral extent of the filter media lamina and is adapted to engage one end filter media lamina 50.

The harness 25 end portion 27 has three integral elastic retaining strips 29, 31 and 33 extending from the periphery of the annular portion 27 and terminating at remote free ends. This annular portion 27 and the elongated strips 29, 31 and 33 are formed of a resilient material to exert an axial compressive force on the stack of filter media lamina, thus, tension on the elastic strips squeezes the media lamina together. The bottom pressure plate 13 is unchanged and includes three notches such as 23 which are peripherally disposed about the end piece for receiving and retaining the free ends of the elongated strips. Bottom pressure plate 13 engages an end filter media lamina 52. The strip free ends include transverse tabs 35, 37 and 39 which engage the pressure plate 13 holding the lamina stack 14 in a compressed state. The number of parts and assembly time is thereby reduced with the annular portion, elongated strips and end piece cooperating to form a cage about the stack of filter media lamina compressing the lamina and retaining the lamina in a stacked columnar alignment. The end portion 27 includes a centrally located aperture 41 for passing filtered lubricant from within the lamina and through a standpipe such as 43 of FIG. 5.

When the filter media stack is assembled into a hollow cylindrical shell which is closed at one end, there is a helical compression coil spring 45 disposed between the shell closed end and the end piece 13 for axially compressing the media stack. It is difficult to properly position this spring, so one modification according to the present invention includes a retaining strap 47 extending from one elongated strip free end as depicted in FIG. 4. This strap may be passed underneath the slightly modified pressure plate 51 of FIGS. 4a and 5 to engage the helical spring 45 temporarily holding the spring in position adjacent the end piece 51 during filter assembly. The end or tip 53 of the retaining strap 47 which is remote from the elongated strip free end 55 is selectively engagable with the slot 57 in the end piece 51. This slot 57 is diametrically opposite the strip end 55 from which it extends when assembled as in FIG. 5.

In FIG. 5, the standpipe 43 is a separate piece, however, additional economies may be achieved by forming the standpipe 59 as an integral part of the end piece 61 as shown in FIGS. 6 and 7. Standpipe 59 is formed integral with the annular portion 69 along the inner periphery thereof and provides a lubricant path from within the filter media lamina to the end of the cylindrical shell opposite the closed one end. In FIG. 6 relatively rigid strips 63, 65 and 67 have been substituted for the elastic strips 29, 31 and 33. The annular portion 69 and integral elongated strips 63, 65 and 67 are formed as a flat sheet of relatively rigid material of generally uniform thickness. There is a transverse relieved portion 71, 73 and 75 along each strip adjacent to the annular portion 69 to form a flexible integral hinge between the annular portion and the corresponding elongated strip. This "living hinge" allows each rigid strip to be pivoted to the positions shown in FIG. 6 where they cooperate with the pressure plate 77 to confine the lamina stack 79. It will be noted that each strip free end includes a ratch in the form of a series of notches or grooves such as 81 and 83. Peripherally disposed about the end piece 77 are three pawl containing structures such as 85 for receiving and retaining the free ends of the elongated strips. These pawls 82 engage a corresponding ratch as best seen in FIG. 8b to securely fasten the opposed pressure plates together. The pawl and strip are freely movable in the stack collapsing direction, however, motion between a pawl and strip in the opposite direction is prevented. When assembled and in use, the stack 79 axially yields under the urging of spring 87. Since the strips 63, 65 and 67 are rigid, as the stack axially yields, the pawl is moved upwardly relative to the strip as shown by the arrow 89 and the pawl moves into engagement with a new notch thereby latching the stack in successive positions of reduced axial extent.

The ratch and pawl arrangement is similar to a "zip-tie" and is also visible in FIG. 9. As noted earlier, there is difficulty maintaining springs 45 or 87 in position during filter cartridge assembly. As an alternative to the strap 47, pressure plate 77 may be provided with a spring receiving socket 89 in which the spring may be retained by friction, a series of detents or a helical thread.

The media stack 79, spring 87 and harness 61, 77 with its integral standpipe 59 have been assembled into a multimedia lubricant filter head in FIG. 12. The stack of FIG. 6 is illustrative and the stacks of FIGS. 2 or 5 may be assembled into such a filter head in the same way. The generally columnar stack 79 of flat filter media lamina provide filtration for one lubricant circuit while a second filter media 91 provides filtration for another lubricant circuit. The hollow cylindrical shell 93 is closed at the left end as viewed and receives the first 79 and second 91 filter media axially adjacent to one another with the first filter media 79 adjacent the closed one end. There are annular spaces 95 and 97 between the outer periphery of each filter media and the shell for providing a common lubricant path to the outer peripheries of the filter media. Standpipe 59 provides a central lubricant path from within the annulus or central part of the filter media 79 to the right end of the cartridge. An annular retainer 99 is formed integral with the shell 93 near the right shell end for engaging the media 91 and retaining both media axially within the shell. The engagement may be direct or through an intermediary such as the grommet rim 115. The annular retainer 99 has a plurality of apertures 101 and 103 for providing a lubricant inlet to the common lubricant path between the shell 93 and the outside of the two filter media. Lubricant flow paths through the filter head are shown by arrows.

A grommet 105 separates the annular full-flow circuit 107 from the central bypass circuit 109. Grommet 105 defines or separates the intermediate generally annular lubricant path 107 from within the annulus of the media 91 to the end of the cylindrical shell. This grommet cooperates with a base member (not shown) when installed thereon to isolate the lubricant inlet (arrow 111), common lubricant path (arrow 113), intermediate or annular lubricant path (arrow 107) and central lubricant path (arrow 109) each from the other.

This grommet is best seen in FIGS. 10 and 11 and includes an outer radial portion 115 to be interposed between the retainer 99 and one end of the filter media 91, an outer cylindrical portion 117 having an inner surface 119 for sealingly engaging a full flow circuit fitting on the base member, an inner cylindrical portion 121 having a first inner cylindrical surface 123 for sealingly engaging the standpipe 59 and a second inner cylindrical surface 125 for sealingly engaging a bypass circuit fitting on the base member. There are a plurality of apertures such as 127 and 129 in the grommet radially intermediate the inner and outer cylindrical portions forming a part of the annular intermediate lubricant path from within the annulus of the media 91. The diameter of the inner cylindrical surface 123 is greater than the diameter of the cylindrical surface 125 and an abutment 131 is formed at their junction. Axial movement of the grommet 105 onto the standpipe 59 is limited by the abutment 131.

What is claimed is:

1. In a multi-media lubricant filter of the type having a hollow cylindrical shell closed at one end, a generally columnar stack of flat filter media lamina for providing filtration for one lubricant circuit, means including a helical compression spring for axially compressing the stack of filter media lamina, and other filter media providing filtration for another lubricant circuit; the improvement comprising a harness for retaining the filter media lamina in stacked columnar alignment comprising a generally circular lubricant impervious end piece having a diameter somewhat greater than the lateral extent of the filter media lamina, the end piece adapted to engage one end filter media lamina, an annular portion for engaging the opposite end filter media lamina, a plurality of elongated strips integral with and extending from the periphery of the annular portion and terminating at remote free ends, and means peripherally disposed about the end piece for receiving and retaining the free ends of the elongated strips, the helical compression spring being disposed between the shell closed end and the end piece and the retaining strap extending from one elongated strip free end for engaging the helical spring and holding the spring in position adjacent the end piece during filter assembly.

2. The harness of claim 1 wherein an end of the retaining strap remote from the elongated strip free end is selectively engagable with the end piece diametrically opposite the strip end from which it extends.

3. The harness of claim 1 wherein the end piece includes a socket for receiving and retaining the compression spring in position during filter assembly.

4. In a multi-media lubricant filter of the type having first annular filter media for providing filtration for one lubricant circuit, second filter media providing filtration for another lubricant circuit, a hollow cylindrical shell closed at one end for receiving the first and second filter media axially adjacent to one another with the first filter media adjacent the closed one end and with annular spaces between the outer periphery of each filter media and the shell for providing a common lubricant path to the outer peripheries of the first and second filter media, a standpipe for providing a central lubricant path from within the first filter media to the end of the cylindrical shell opposite the closed one end, and an annular retainer integral with the shell near the other shell end for engaging the second media and retaining both media axially within the shell, the annular retainer having a plurality of apertures for providing a lubricant inlet to the common lubricant path; the improvement comprising a grommet defining an intermediate generally annular lubricant path from within the annulus of the second media to the end of the cylindrical shell opposite the closed one end, the grommet cooperating with a base member when installed thereon to isolate the lubricant inlet, common lubricant path, intermediate lubricant path and central lubricant path each from the other, the grommet including an outer radial portion interposed between the retainer and one end of the second filter media, an outer cylindrical portion having an inner surface for sealingly engaging a full flow circuit fitting on the base member, an inner cylindrical portion having a first inner cylindrical surface sealingly engaging the standpipe and a second inner cylindrical surface for sealingly engaging a bypass circuit fitting on the base member.

5. The improvement of claim 1 wherein the intermediate lubricant path from within the annulus of the second media includes a plurality of apertures in the grommet radially intermediate the inner and outer cylindrical portions.

6. The improvement of claim 1 wherein the diameter of the first inner cylindrical surface is greater than the diameter of the second cylindrical surface, the inner cylindrical surfaces being joined at an annular abutment adapted to limit axial movement of the grommet onto the standpipe.

7. In a multi-media lubricant filter of the type having a hollow cylindrical shell closed at one end, a generally columnar stack of flat filter media lamina for providing filtration for one lubricant circuit, means including a helical compression spring for axially compressing the stack of filter media lamina, and other filter media providing filtration for another lubricant circuit the improvement comprising; a harness for retaining the filter media lamina in stacked columnar alignment comprising a generally circular lubricant impervious end piece having a diameter somewhat greater than the lateral extent of the filter media lamina, the end piece adapted to engage one end filter media lamina, an annular portion for engaging the opposite end filter media lamina, a plurality of elongated strips integral with and extending from the periphery of the annular portion and terminating at remote free ends, means peripherally disposed about the end piece for receiving and retaining the free ends of the elongated strips, the helical compression spring disposed between the shell closed end and the end piece, and wherein the annular portion and integral elongated strips are formed as a flat sheet of relatively rigid material of generally uniform thickness with a transverse relieved portion along each strip adjacent to the annular portion to form a flexible integral hinge between the annular portion and the corresponding elongated strip.

8. The harness of claim 7 wherein each elongated strip free end includes a ratch and the means peripherally disposed about the end piece for receiving and retaining the free ends of the elongated strips comprises a like plurality of pawls for engaging a corresponding ratch whereby when the stack of filter media yields axially under the urging of the compression spring, the ratches and pawls latch the stack in successive positions of reduced axial extent.

9. The harness of claim 1 wherein the filter further includes a standpipe integral with the annular portion along the inner periphery thereof for providing a lubricant path from within the filter media lamina to the end of the cylindrical shell opposite the closed one end.

10. In a multi-media lubricant filter of the type having first annular filter media for providing filtration for one lubricant circuit, the first filter media comprising a generally cylindrical stack of annular filter media lamina for providing filtration for the one lubricant circuit and means for axially compressing the stack of filter media lamina, second filter media providing filtration for another lubricant circuit, a hollow cylindrical shell closed at one end for receiving the first and second filter media axially adjacent to one another with the first filter media adjacent the closed one end and with annular spaces between the outer periphery of each filter media and the shell for providing a common lubricant path to the outer peripheries of the first and second filter media, a standpipe for providing a central lubricant path from within the first filter media to the end of the cylindrical shell opposite the closed one end, and an annular retainer integral with the shell near the other shell end for engaging the second media and retaining both media axially within the shell, the annular retainer having a plurality of apertures for providing a lubricant inlet to the common lubricant path; the improvement comprising:

a grommet defining an intermediate generally annular lubricant path from within the annulus of the second media to the end of the cylindrical shell opposite the closed one end, the grommet cooperating with a base member when installed thereon to isolate the lubricant inlet, common lubricant path, intermediate lubricant path and central lubricant path each from the other; and a harness for retaining the filter media lamina in stacked columnar alignment comprising a generally circular lubricant impervious end piece having a diameter somewhat greater than the diameter of the filter media lamina, the end piece adapted to engage one end filter media lamina, an annular portion for engaging the opposite end filter media disk, a plurality of elongated strips integral with and extending from the periphery of the annular portion and terminating at remote free ends, and means peripherally disposed about the end piece for receiving and retaining the free ends of the elongated strips.

11. The improvement of claim 10 wherein the means for axially compressing comprises a helical compression spring disposed between the shell closed end and the end piece, and further including a retaining strap extending from one elongated strip free end for engaging the helical spring and holding the spring in position adjacent the end piece during filter assembly.

12. The improvement of claim 11 wherein an end of the retaining strap remote from the elongated strip free end is selectively engagable with the end piece diametrically opposite the strip end from which it extends.

13. The improvement of claim 10 wherein the means for axially compressing the stack comprises a helical compression spring disposed between the shell closed end and the end piece, and wherein the annular portion and integral elongated strips are formed as a flat sheet of relatively rigid material of generally uniform thickness with a transverse relieved portion along each strip adjacent to the annular portion to form a flexible integral hinge between the annular portion and the corresponding elongated strip.

14. The improvement of claim 13 wherein each elongated strip free end includes a ratch and the means peripherally disposed about the end piece for receiving and retaining the free ends of the elongated strips comprises a like plurality of pawls for engaging a corresponding ratch whereby when the stack of filter media yields axially under the urging of the compression spring, the ratches and pawls latch the stack in successive positions of reduced axial extent.

15. The improvement of claim 10 wherein the annular portion and the plurality of elongated strips are formed of a resilient material for exerting an axial compressive force on the stack of filter media lamina when assembled thereto.

16. The improvement of claim 10 wherein the elongated strip free ends include transverse tabs and the means peripherally disposed about the end piece for receiving and retaining the free ends of the elongated strips comprise notches for receiving the strips and engaging the corresponding tabs.

17. The harness of claim 10 wherein the means for axially compressing the stack comprises a helical compression spring disposed between the shell closed end and the end piece, the end piece including a socket for receiving and retaining the compression spring in position during filter assembly, and wherein the annular portion and integral elongated strips are formed of a relatively rigid material of generally uniform thickness with a transverse relieved portion along each strip adjacent to the annular portion to form a flexible integral hinge between the annular portion and the corresponding elongated strip, the filter further comprising a standpipe integral with the annular portion along the inner periphery thereof for providing a lubricant path from within the filter media lamina to the end of the cylindrical shell opposite the closed one end.

* * * * *